AUTOMATIC RADIO PROGRAM RATING SYSTEM

Filed Aug. 20, 1951 2 Sheets-Sheet 1

INVENTOR.
GIBSON REYNOLDS
BY
ATTORNEY

INVENTOR.
GIBSON REYNOLDS
BY
ATTORNEY

United States Patent Office 2,716,702

Patented Aug. 30, 1955

2,716,702

AUTOMATIC RADIO PROGRAM RATING SYSTEM

Gibson Reynolds, New York, N. Y., assignor to William D. Horn, New York, N. Y.

Application August 20, 1951, Serial No. 242,698

1 Claim. (Cl. 250—2)

Figure 1:
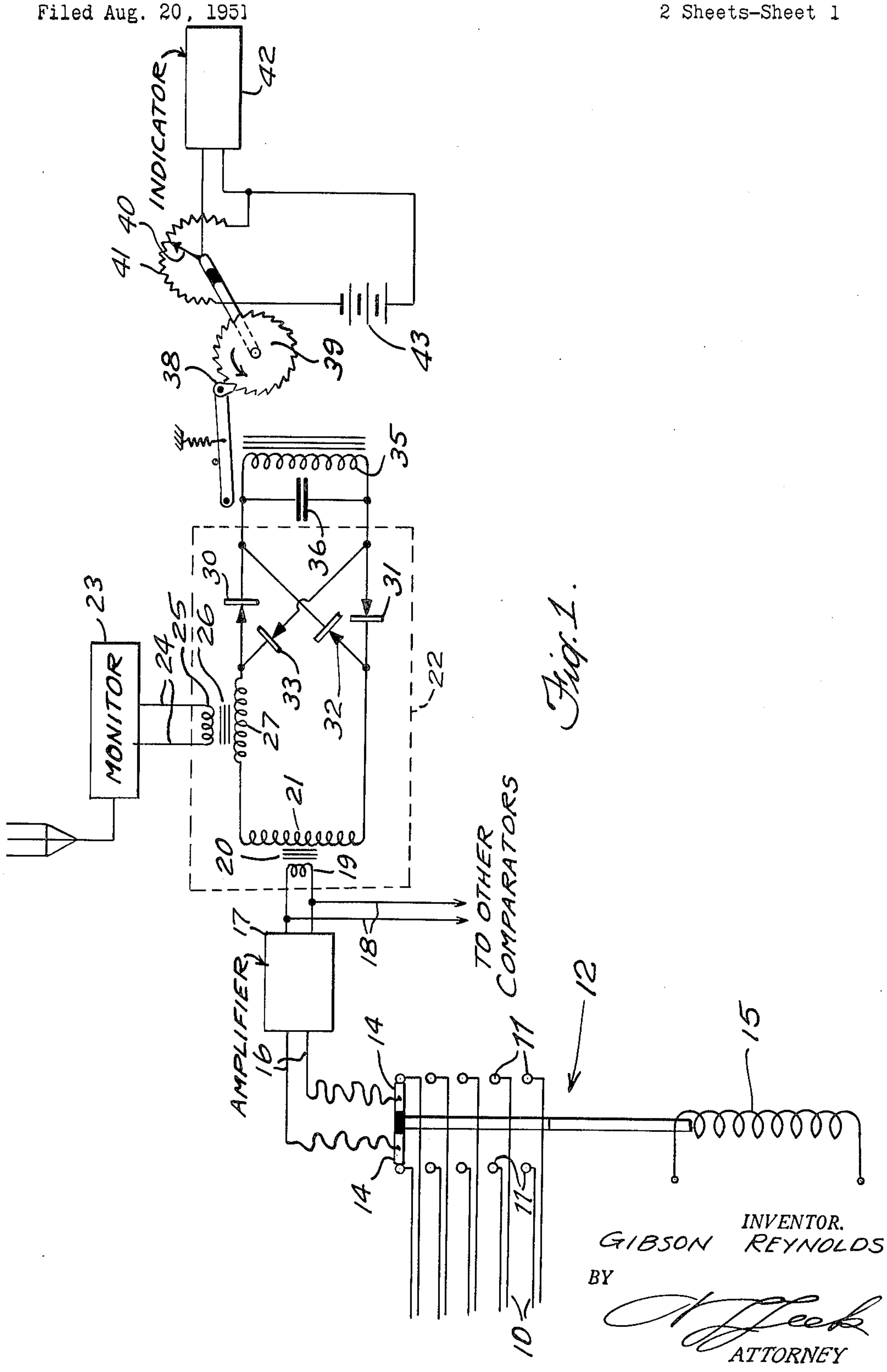

This invention relates to an automatic radio program rating system and more particularly to a system for determining at frequent intervals the number of home radio receivers of a selected group which are receiving a given radio broadcast program.

An object of the invention is to provide a system of the above type which automatically compares the signal being received by a selected home radio receiver with the signal being received by a monitor radio receiver and indicates whether or not the two radios are receiving the same program.

Another object is to provide a system for comparing electrically a pair of signals derived from different sources and determining their correlation or lack of correlation.

Another object is to provide a system of the above type which is suited to commercial operation.

Various other objects and advantages will be apparent as the nature of the invention is more fully disclosed.

In accordance with the present invention a plurality of monitor radio receivers at a central monitor station are permanently tuned to receive the different broadcast programs which are to be rated and to supply such programs to individual comparator circuits which are adapted to compare a pair of input signals and actuate an output circuit in response to signal correlation. The audio signals being received by a selected group of home radio receivers are transmitted to the central monitor station by suitable means such as by telephone lines and are fed to the comparator circuits for comparison with the signals from the various monitors. An output signal from one of the comparator circuits indicates correlation between the home radio and the particular monitor connected thereto. Stepping switches may be provided to connect the lines from the various home receivers in sequence to the comparator circuits and means may be provided for making a record of the number of different home radios which correlate with each monitor. The number of these correlations constitute an indication of the number of home radios of the selected group which are receiving each monitored program at that instant. By repeating the process cyclically at frequent intervals a practically continuous record may be obtained.

The correlator output signal may be visual as for example a light which appears only when correlation occurs or may be accumulated by means of suitable indicators in which event after each of the signals from the home radios have been compared with the monitor signals, the indicators will indicate the number of home radio receivers tuned to each monitored program.

More specifically, in the comparator circuit one signal is modulated with the other signal in a device which is capable of producing difference frequencies such as a balanced modulator of the carrier suppression type. The output of such a modulator normally comprises the sum and difference frequencies. When both inputs contain the same signal frequencies the difference frequencies become zero. Hence the modulator output representing the difference frequencies becomes a unidirectional voltage when identical frequencies are present in the two inputs. When identical frequencies are not present the difference frequency has a value other than zero and alternating voltages are produced in the output. In the present system such alternating voltages are eliminated by suitable filters and the unidirectional output is used as an indication of correlation between the two signals.

The unidirectional output is used directly or indirectly to actuate an indicator. It may for example energize a thyratron connected to control a signal light or it may be used to actuate a relay which controls a counter.

The nature of the invention will be better understood by referring to the following description, taken in connection with the accompanying drawings in which specific embodiments thereof have been set forth for purposes of illustration.

Figure 2:
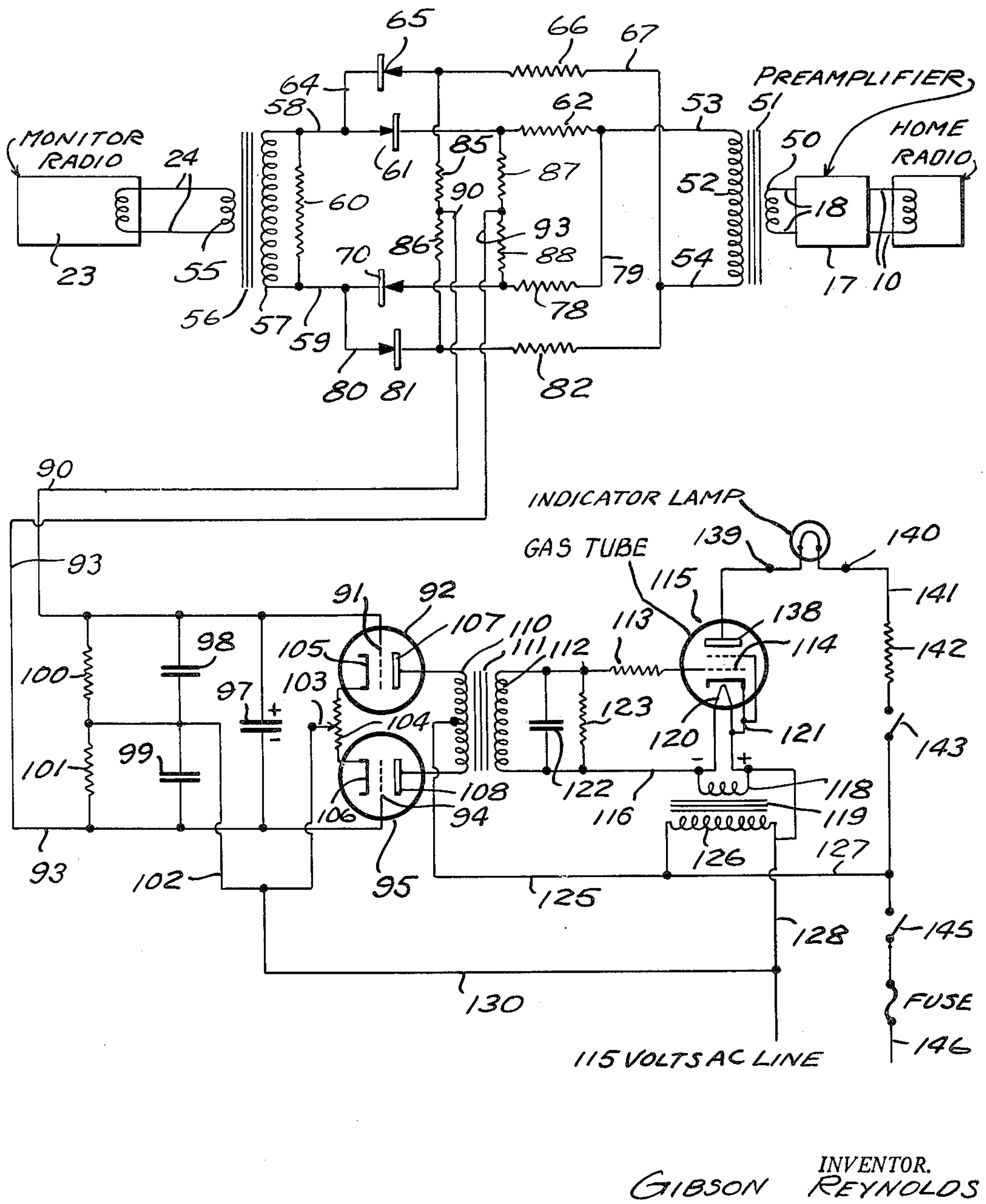

In the drawings:

Fig. 1 is a schematic diagram of a program rating system embodying the present invention; and Fig. 2 is a schematic diagram of a comparator circuit adapted to actuate a visual signal.

Referring now to Fig. 1 a plurality of telephone lines 10 which are connected to the audio output circuits of a selected group of home receivers located at distant points and carrying audio frequency signals derived therefrom, are connected across successive pairs of stationary contacts 11 of a stepping switch 12 which may be of standard construction and is provided with stepping contacts 14 which are stepped successively from one pair of contacts 11 to the next by the pulsing of a stepping coil 15. The stepping switch 12 may be circular in form so that the stepping contacts 14 traverse the entire group of stationary contacts 11 repeatedly and cyclically.

The stepping contacts 14 are connected by leads 16 to an amplifier 17 the output of which is connected by leads 18 to a comparator circuit enclosed in the dotted rectangle 22. Only one comparator is shown in the drawing, but in practice separate comparators will be used for each monitored program. In the form shown the comparator includes the primary 19 of an input transformer 20 having a secondary 21.

Monitor receiver 23, which is permanently tuned to receive a selected radio broadcast program is connected by leads 24 to the primary 25 of a transformer 26 having a secondary 27 which constitutes a second input to the comparator circuit. The comparator circuit is shown as a ring modulator which includes oppositely poled rectifiers 30, 31 and crossed rectifiers 32, 33. The transformer secondaries 21 and 27 are connected in series to the input end of the ring modulator. The output end is connected to a relay coil 35 by-passed by a condenser 36 to eliminate alternating voltages. The coil 35 actuates a pawl 38 of a ratchet 39 which drives the moving contact 40 of a potentiometer 41. The moving contact 40 is connected to a suitable indicator 42 which may constitute a voltmeter. A potential source 43 is connected across the potentiometer 41.

The ring modulator is a type of balanced modulator which produces the sum and difference frequencies of the applied signals. The condenser 36 by-passes alternating voltages so that only the unidirectional output voltage energizes the relay coil 35. This unidirectional voltage corresponds to zero difference frequency and is present only when the same frequencies are present in the two modulator input signals. Hence energization of the relay coil 35 indicates correlation between the two input signals.

The stepping switch is actuated by pulsing the coil 15 from a suitable pulse source to connect the lines 10 in succession to the amplifier 17 for comparison with the signals from the monitor receiver 23. If there is lack of correlation between the signals from the connected line 10 and the monitor receiver there is no pulsing of the relay coil 35. But whenever a line 10 is connected to the amplifier 17 that is carrying the same signal as the monitor receiver the coil 35 is energized and the ratchet 39 is stepped around one step. This changes the position of the contact 40 which is indicated by the voltage impressed on the indicator 42. After all of the lines 10 have been connected in sequence to the amplifier 17 the number of steps advanced by the ratchet 39 represents the number of home radios of the selected group which were receiving the program being monitored by the monitor receiver 23.

The comparator circuits and monitors may be duplicated for each program to be rated. Only one such monitor has been shown for purposes of illustration. Also the telephone lines 10 may be multiplexed if desired.

In the embodiment of Fig. 2 a different type of correlator circuit is used to energize an indicator light in response to correlation of the two input signals. In this embodiment the line 18 from the home radio pre-amplifier 17 is connected to the primary 50 of an input transformer 51 having a secondary 52 connected to leads 53 and 54. The leads 24 from the monitor radio 23 are connected to the primary 55 of an input transformer 56 having a secondary 57 connected to leads 58 and 59 and shunted by a resistance 60. The lead 58 is connected through a diode rectifier 61 and resistor 62 to the lead 53. The lead 58 is also connected by a lead 64 to diode rectifier 65 which is poled oppositely to the rectifier 61, thence through resistor 66 and lead 67 to the lead 54.

The lead 59 is connected to diode rectifier 70 and resistor 78, thence by lead 79 to the lead 53. The lead 59 is also connected by lead 80 to a diode rectifier 81 which is poled oppositely to the rectifier 70, thence through resistor 82 to the lead 54. A pair of resistors 85 and 86 are connected in series between the rectifier sides of the resistors 66 and 82, and a pair of resistances 87, 88 are connected in series across the rectifier sides of the resistors 62 and 78.

The junction of resistors 85 and 86 is connected by a lead 90 to the grid 91 of a triode 92. The junction of the resistors 87 and 88 is connected by lead 93 to the grid 94 of a triode 95. A condenser 97 is connected across the leads 90 and 93. Condensers 98 and 99 shunted by resistors 100 and 101 are connected in series across the leads 90 and 93 and the junction of condensers 98 and 99 is connected by a lead 102 to a variable tap 103 of a potentiometer 104, the ends of which are connected to cathodes 105 and 106 of triodes 92 and 95 respectively.

Anodes 107 and 108 of triodes 92 and 95 respectively are connected to the ends of primary 110 of a transformer 111 having a secondary 112 one side of which is connected through a resistor 113 to the grid 114 of a gas tube or thyratron 115, and the other side of which is connected by a lead 116 to one side of the secondary 118 of a filament transformer 119 which supplies heating current to a heater 120 for cathode 121 of the thyratron 115 and bias to grid 114 of the thyratron 115. A condenser 122 and resistor 123 are connected across the transformer secondary 112.

The center point of the primary 110 is connected by a lead 125 to one side of the primary 126 of the transformer 119 which in turn is connected by leads 127 and 128 across an alternating current supply line. The lead 102 is connected by a lead 130 to the lead 128. The thyratron 115 is provided with an anode 138 which is connected to an output terminal 139. A second output terminal 140 is connected by a lead 141 through a resistor 142 and switch 143 to the lead 127 and also through main switch 145 to the alternating current supply line 146.

Transformers 51 and 56 serve as isolation transformers in addition to providing the necessary gain. The preamplifier 17 is a conventional amplifier with associated D. C. power supply. Resistances 100 and 101 constitute a network for providing a balanced D. C. output of the modulator with respect to the cathodes 105 and 106. Condensers 98 and 99 are to assure that the grid-to-cathode voltages of the triodes 92 and 95 contain no spurious A. C. picked-up voltages, while the resistors 100 and 101 convert the D. C. modulator output voltage to a positive voltage for application to the grid 91 and an equal negative voltage for application to the grid 94. The potentiometer 104 provides a means for adjusting the relative grid biases on the grids of the two triodes and thereby varying the sensitivity of the overall circuit. The triodes and the transformer 111 serve to convert the D. C. modulator output voltage, filtered by the condenser 97, to an amplified A. C. voltage of such phase that it can be used to fire the thyratron 115. Resistance 123 is a transformer load resistor and the condenser 122 provides a high frequency bypass for any spurious high order harmonics generated in the conversion process. The resistor 113 which may be of the order of 1 megohm is a protective resistor in the grid circuit to prevent damage to the tube.

The heater voltage has been shown as connected so that it provides a negative bias for the grid 114 when the plate 138 is positive. The sensitivity control potentiometer 104 in conjunction with the anode supply voltage of the thyratron 115 determines the actual firing of the thyratron. When the thyratron fires a voltage is applied across the output terminals 139 and 140. In the case of a light indicator connected across the terminals 139 and 140 plate current will flow through the thyratron to actuate the light. The resistor 142 which may be of the order of 500 ohms limits the plate current to a reasonable value. A separate plate switch 143 is provided as in usual practice so that the thyratron filament can be heated for a few seconds before the plate voltage is applied.

It is to be understood that other types of modulators may be substituted for the types shown in Figs. 1 and 2 according to the results desired. In any event the arrangement is such that when the signal from the home radio is modulated by a signal from the monitor radio or vice versa a unidirectional output voltage is obtained at the modulator output leads when the two signals are predominantly of the same frequencies and at other times an alternating voltage is obtained at these leads. The alternating output voltage is disregarded and the unidirectional output voltage is connected in one case to the triodes 92 and 95 (Fig. 2) to fire the thyratron 115, or in another case to actuate the D. C. relay 35 of Fig. 1, whenever correlation occurs between the two signals. It is to be understood of course that this correlation may be determined by the signal frequencies or may be determined in accordance with the envelope of the signal frequencies or by the radio frequency depending upon the timing of the circuit and the signal which is applied thereto. If the circuit is timed to operate on the envelope of the audio frequency signal obviously a sufficient time must be permitted for correlation to become effective at each actuation of the stepping switch. If operating on radio frequencies correlation would respond to the carriers. Television signals may also be correlated either in the video or audio channels.

In case it is desired to make a record of the operation of any particular home radio additional stepping switches may be used with stepping contacts synchronized with the stepping contact 14 of the stepping switch 12 and with stationary contacts connected to recorders to record the operation of the individual home radios.

Although specific embodiments of the invention have been shown for purposes of illustration it is to be understood that changes and modifications may be made therein as will be readily apparent to a person skilled in the art.

What is claimed is:

A broadcast program rating system for determining the number of home receivers of a selected group which are receiving a given broadcast program, comprising a central monitor station having a plurality of lines connected to carry signals from said home receivers to said central monitor station, a plurality of monitor radio receivers at said central monitor station permanently tuned to receive the selected broadcast programs to be rated, a comparator circuit connected to each of said monitor receivers and having means producing an output signal in response to correlation between a pair of applied signals, means connecting said lines in timed sequence to said comparator circuits whereby the signal carried by each line is compared with the signal from each monitor receiver by said comparator circuits, and accumulator means in the output of each comparator circuit to respond to the total number of coincidences between the monitored program and the programs received by said lines, said accumulator means including a stepping relay connected to drive the contact arm of a potentiometer and means connected to said potentiometer to indicate the position thereof.

References Cited in the file of this patent

UNITED STATES PATENTS

| | | |
|---|---|---|
| 2,484,733 | Rahmel et al. | Oct. 11, 1949 |
| 2,630,365 | Rahmel | Mar. 3, 1953 |
| 2,630,366 | Rahmel | Mar. 3, 1953 |